United States Patent
Tonucci et al.

(10) Patent No.: US 6,483,640 B1
(45) Date of Patent: Nov. 19, 2002

(54) OPTICAL NOTCH FILTERS BASED ON TWO-DIMENSIONAL PHOTONIC BAND-GAP MATERIALS

(75) Inventors: Ronald J. Tonucci, Waldorf, MD (US); Armand Rosenberg, College Park, MD (US); Horn B. Lin, Fairfax, VA (US); Anthony J. Campillo, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/847,171

(22) Filed: Apr. 8, 1997

(51) Int. Cl.$^7$ ............................ G02B 5/20; H01Q 15/14
(52) U.S. Cl. ..................... 359/361; 359/350; 343/909; 343/895
(58) Field of Search ................. 359/350–361, 359/586–589; 343/909; 333/202

(56) References Cited

U.S. PATENT DOCUMENTS

| | | | |
|---|---|---|---|
| 5,234,594 A | 8/1993 | Tonucci et al. | 210/500.26 |
| 5,264,722 A | 11/1993 | Tonucci et al. | 257/443 |
| 5,306,661 A | 4/1994 | Tonucci et al. | 437/90 |
| 5,332,681 A | 7/1994 | Tonucci et al. | 437/16 |
| 5,389,943 A | 2/1995 | Brommer et al. | 343/909 |
| 5,471,180 A | 11/1995 | Brommer et al. | 333/202 |
| 5,526,449 A | * | 6/1996 | Meade et al. | 385/15 |

OTHER PUBLICATIONS

Rosenberg et al, "Photonic Band Structure of Nanochannel Materials", Abstract submission to symposium Microporous and Macroporous Materials, Materials Research Society 1996 Spring Meeting, Apr. 8–12, 1996, San Francisco, CA.

Inoue et al "Fabrication of Two Dimensional Photonic Band Structure with Near–Infrared Band Gap" Jpn. J. Appl. Phys. vol. 33 (1994) pp L 1463—L 1465.

Villeneuve et al, "Photonic Band Gaps in Two–Dimensional Square Lattices: Square and Circular Rods", Physical Review B (Condensed Matter), vol. 46, No. 8, (1992) pp 4973–4975.

Plihal et al, "Two–dimensional Photonic Band Structures", Optical Communications, vol. 80, No. 3–4, (1990) pp 199–204.

Plihal et al "Photonic Band Structure of Two–Dimensional Systems: The Triangular Lattice" Phys. Rev. B 44, 8565–8571 (1991).

Winn et al "Two–Dimensional Photonic Band Gap Materials" J. Mod. Optics 41, 257–273 (1994).

Tonucci et al, "Nanochannel Array Glass" Science 258, 783 (1992).

Sakoda "Optical Transmittance of a Two–Dimensional Triangular Photonic Lattice" Phy. rev. B 51, (1995), 4672–4675.

Krauss et al, "Two–dimensional Photonic–Bandgap Structures Operating at Near–Infrared Wavelengths", Nature, vol. 383, No. 6602, (Oct. 26, 1996) pp 699–702.

Cassagne et al, "New Hexagonal structures for Two–Dimensional Photonic band Gap Materials" Nuovo Climento D, vol. 17D, Ser. 1, No. 11, (1995) pp 1401–1405.

Lin et al "Observation of Two–Dimensional Photonic Behavior in the Visible", Appl. Phys. Lett 68 (21), pp 2927–2929 (1996).

(List continued on next page.)

*Primary Examiner*—Thong Nguyen
(74) *Attorney, Agent, or Firm*—John J. Karasek; Joseph T. Grunkemeyer

(57) ABSTRACT

A band-gap spectral filter is made of a nanochannel glass structure having a two-dimensional array of parallel dielectric rods arranged in a matrix material. The materials for the dielectric rods and the matrix material are selected so that the difference between the refractive index of the dielectric rods and the refractive index of the matrix material is equal to or less than about 0.5.

38 Claims, 7 Drawing Sheets

OTHER PUBLICATIONS

Rosenberg et al, "Photonic–Band Structure Effects for the Low–Index–Contrast Two–Dimensional Lattices in the Near–Infrared", Phys. Rev. B 54 (8) pp R5195–R5198 (1996).

Rosenberg et al "Near–Infrared Two–Dimensional Photonic Band–Gap Materials", Optic Letters, vol. 21, No. 11 pp. 830–832 (1996).

* cited by examiner

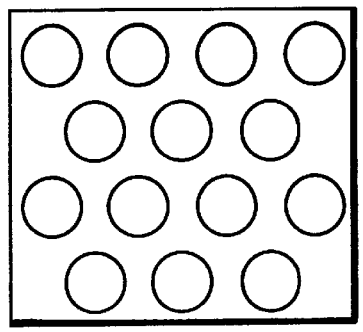
FIG. 1A  TRIANGULAR LATTICE
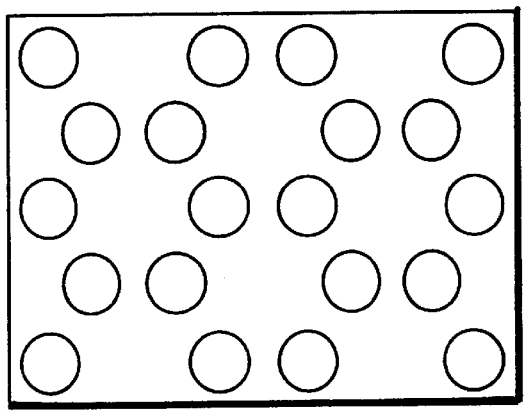
FIG. 1B  GRAPHITE LATTICE
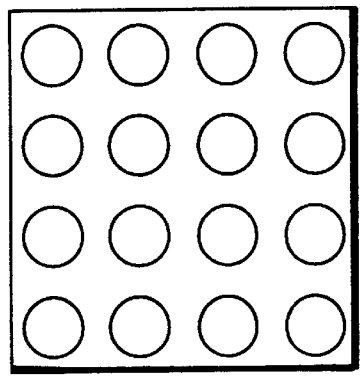
FIG. 1C  SQUARE LATTICE
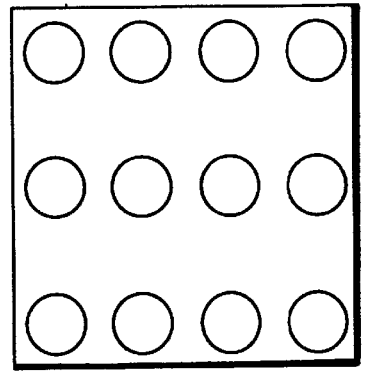
FIG. 1D  RECTANGULAR LATTICE

OPTICAL NOTCH FILTERS BASED ON TWO-DIMENSIONAL PHOTONIC BAND-GAP MATERIALS

BACKGROUND OF THE INVENTION

1. Field of the Invention

The present invention relates to periodic dielectric structures and, in particular to optical notch filters made of nanochannel glass material having a two-dimensional array of rods in a matrix.

2. Background of the Related Art

Currently, notch filters are generally made by vacuum deposition of multilayer dielectric films on a transparent substrate. These filters have very limited useful acceptance angles since the spectral properties are angle-dependent; in fact, they are generally useful only for collimated light sources, especially when the notches in the transmission are narrow. In addition, the multilayer dielectric film filters are very sensitive to environmental factors such as heat, humidity and mechanical contact, and their optical properties degrade easily. They are particularly difficult to clean since some of the materials used for the thin-film layers are soft and easily damaged by scratching. Finally, the multilayer dielectric film filters are easily damaged by high-power sources, such as many lasers.

A dielectric filter comprising a two-dimensional lattice structure is described in U.S. Pat. No. 5,389,943, the disclosure of which is incorporated herein by reference. The structure is formed by boring holes in a high dielectric material or by stacking and aligning sheets of high dielectric material having holes bored therein. Therefore, the frequency range that can be filtered by such a structure is necessarily limited by the size of the holes that can be drilled.

A two-dimensional photonic band structure consisting of a triangular lattice of circular air rods ($\epsilon_1=1.0$) in a matrix of microchannel Pb—O glass ($\epsilon_2=2.6$) is described in Inoue et al "Fabrication of Two Dimensional Photonic Band Structure with Near-Infrared Band Gap" Jpn. J. Appl. Phys. Vol. 33 (1994) pp L 1463–L 1465.

SUMMARY OF THE INVENTION

It is an object of the invention to provide spectral filters having band gaps from the infrared to the ultraviolet.

It is another object of the invention to provide band-gap spectral filters comprising periodic dielectric elements wherein the size, shape, separation and index of refraction of the periodic dielectric elements can be selected to control the width, depth and sharpness of the band gap.

It is another object of the invention to provide band-gap spectral filters that are rugged and resistant to damage from environmental conditions.

It is another object of the invention to provide band-gap spectral filters that are insensitive to the direction of propagation of light.

It is another object of the invention to provide band-gap spectral filters that are highly sensitive to the direction of propagation of light.

The above objects are accomplished by a band-gap spectral filter comprising a nanochannel glass structure having a two-dimensional array of parallel dielectric rods having a first refractive index, arranged in a matrix material having a second refractive index, wherein the difference between the first refractive index and the second refractive index is equal to or less than about 0.7.

BRIEF DESCRIPTION OF THE DRAWINGS

FIGS. 1A–D are examples of a triangular lattice, graphite lattice, square lattice and rectangular lattice.

DETAILED DESCRIPTION OF THE PREFERRED EMBODIMENTS

Figures 2A, 2B:
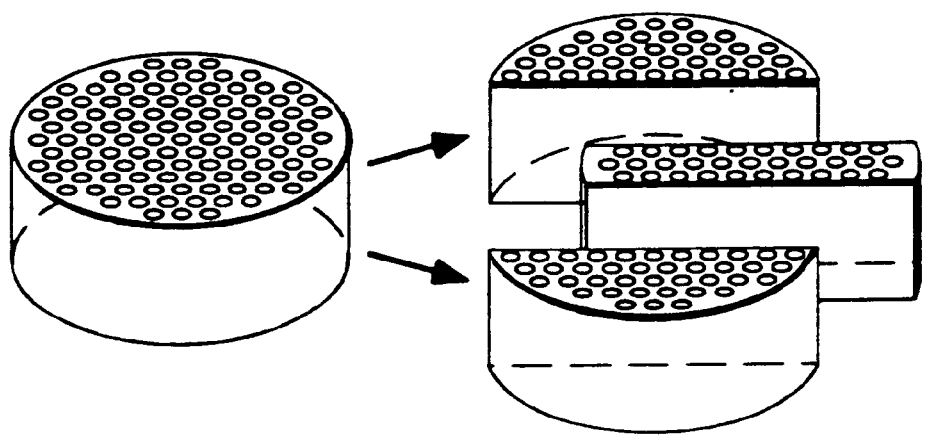
FIG. 2A and B are diagrammatic perspective views of a nanochannel glass filter before and after sectioning.

The invention relates more generally to highly versatile-notch filters useable in the UV, visible and IR spectral regions, which can be relatively insensitive to the direction of propagation, of light as well as being much more rugged than current alternatives. These filters consist of two-dimensional periodic dielectric structures, with the light propagating in the plane of the structure. For example, this can be achieved with a two-dimensional lattice of "rods" having an index of refraction (n) different from that of the surrounding medium ("matrix" material). The separation of the "rods" is chosen to be comparable to the wavelength of the radiation to be blocked by the filter. The typical cross-sectional dimension of the "rods" can either be small enough to ensure no overlap, or large enough to permit overlap: in both cases, useful structures are obtained. The "rods" need not have circular cross-section, and complex arrays consisting either of several kinds of "rods" in a "matrix" (having several indices of refraction and/or cross-sectional shapes or sizes), or of repeating groups of such "rods," or both, can be used. All dielectric materials in such an array are generally transparent throughout the spectral region of interest. Thus, these filters do not rely on intrinsic absorptions of the constituent materials, but rather on the properties of uniform arrays of dielectric materials. For particular wavelength ranges, light cannot propagate through such a two-dimensional array if it is incident along certain directions in the plane of the array. Effectively, the array becomes an optical notch filter. The optical properties of these filters are determined by the differences in the indices of refraction, as well as the sizes, shapes, patterns and separation of the elements in the periodic dielectric structures. Through control of these variables, this method permits the fabrication of notch filters where each notch in the transmission occurs at any desired wavelength, from the UV to the far-IR, and has a controllable width, depth and sharpness. The sharpest notches are obtained for small differences in indices ($\Delta n = |n_{"rod"} - n_{"matrix"}| = 10^{-2}$ or less), while the broadest are obtained for large differences ($\Delta n > 3$).

In particular, the present invention is a band-gap spectral filter comprising a nanochannel glass structure having a two-dimensional array of parallel dielectric rods having a first refractive index, arranged in a matrix material having a second refractive index, wherein the difference between the first refractive index and the second refractive index is equal to or less than about 0.7.

As further limitation of the invention, the difference between the first refractive index and the second refractive index may be equal to or less than about 0.1, equal to or less than about 0.05, equal to or less than about 0.02, or equal to or less than about 0.01.

The rods may have a circular cross-section. The rods may be arranged in a hexagonal closed packed array, a triangular array, a rectangular array, a square array, or a graphite array. The rods may have an equal radius and the distance between adjacent rods may be less than five times the radius of the rods or less that three times the radius of the rods. Alternatively, the distance between the rods may be more than five times the radius of the rods.

The matrix material may be selected from the group of glasses consisting of silicates, alumino-silicates and aluminates. Alternatively, the matrix material may be selected from the group of glasses consisting of germanates, phosphates and borates or may be selected from the group consisting of oxides and fluorides of rare-earth metals and transition metals. Likewise, the rods may be selected from the group of glasses consisting of silicates, alumino-silicates and aluminates. Alternatively, the rods may be selected from the group of glasses consisting of germanates, phosphates and borates or may be selected from the group consisting of oxides and fluorides of rare-earth metals and transition metals. The rods may be of a material such that the index of refraction varies radially within the rod.

The nanochannel glass structure may include a surface oriented to receive electromagnetic energy in a direction approximately transverse to the axes of the parallel rods. The filter may be angle tunable about an axis parallel to the axis of the rods and may be tilt tunable about an axis perpendicular to the rods.

All the above can be varied to provide a spectral band gap filters having spectral attenuation features occurring in the infrared, the near infrared, the visible or the ultraviolet portion of the spectrum.

Alternatively, the invention relates to band-gap spectral filter comprising a nanochannel glass structure having a two-dimensional lattice array comprising an ordered mixture of at least two types of parallel dielectric rods having a different refractive indices, arranged in a matrix material or an ordered mixture of at least two types of parallel dielectric rods having a different diameters, arranged in a matrix material.

The present invention further relates to method of forming an optical filter comprising the steps of providing a nanochannel glass structure having a two-dimensional array of parallel dielectric rods having a first refractive index, arranged in a matrix material having a second refractive index, wherein the difference between the first refractive index and the second refractive index is less than 0.5 and cutting the nanochannel glass structure to form a surface thereon, the surface being oriented to receive electromagnetic energy propagating in a direction approximately transverse to the axes of the parallel rods.

The present invention further relates to a method of forming an optical filter comprising the steps of providing a nanochannel glass structure having a two-dimensional array of parallel dielectric rods of etchable glass, arranged in a matrix material of nonetchable glass, removing the etchable glass to create hollow channels through the nonetchable glass, filling the hollow channels with a nonglass material, and cutting the nanochannel glass structure to form a surface thereon, the surface being oriented to receive electromagnetic energy propagating in a direction approximately transverse to the axes of the parallel rods. The nonglass material may be selected from the group consisting of metals, polymers and semiconductors, may be a polymer containing refractive index modifying materials. The refractive index modifying material may be selected from the group consisting of semiconductor nano-crystals, laser dyes and luminescent materials. The step of filling the hollow channels with a nonglass material may be carried out in a manner so that the index of refraction of each filled channel varies in a radial direction or so that the index of refraction of each filled channel varies in a radial direction in a stepwise fashion.

Band gap filters based on two-dimensional periodic structures are described generally and theoretically in Plihal et al "Photonic Band Structure of Two-Dimensional Systems: The Triangular Lattice" Phys. Rev. B 44, 8565–8571 (1991), Winn et al "Two-Dimensional Photonic Band Gap Materials" J. Mod. Optics 41, 257–273 (1994), Sakoda "Optical Transmittance of a Two-Dimensional Triangular Photonic Lattice" Phy. rev. B 51, 4672–4675, Lin et al "Observation of Two-Dimensional Photonic Behavior in the Visible", Appl. Phys. Lett 68 (21), pp 2927–2929 (1996), Rosenberg et al, "Photonic-Band Structure Effects for the Low-Index-Contrast Two-Dimensional Lattices in the Near-Infrared", Phys. Rev. B 54 (8) pp R5195–R5198 (1996),and Rosenberg et al "Near-Infrared Two-Dimensional Photonic Band-Gap Materials", Optic Letters, Vol 21, No. 11 pp.830–832 (1996). The entire disclosure of the preceding articles are incorporated by reference herein in their entirety.

Basically, photonic crystals are the optical analog of electronic crystals, such as semiconductors, in which the periodic "potential" of the photonic crystal is due to a lattice of macroscopic dielectric media instead of atoms. Scattering of light at the interfaces of the periodic dielectric lattice can produce many of the same phenomena for photons (light modes) as the atomic potential does for electrons.

Materials suitable for the practice of the invention are preferably nanochannel glass that has an array of substantially uniform, parallel, rods of a dielectric material having a first index of refraction embedded in a matrix material having a second index of refraction. Nanochannel glass material may be obtained by methods described in U.S. Pat No. 5,306,611, U.S. Pat. No. 5,264,722, U.S. Pat. No. 5,332,681 and U.S. Pat No. 5,234,594, in Tonucci et al, "Nanochannel Array Glass" Science 258,783 (1992), the entire disclosures of which are incorporated herein by reference in their entirety. Nanochannel glass may also be referred to as "NCG" material.

Nanochannel glass materials have been successfully thermally cycled from liquid helium temperatures to temperatures in excess of 600 degrees centigrade without damage. They can have an open area to total surface ratio in excess of 75%. In addition, nanochannel glass is a rigid structure and therefore the components of the structure are not susceptible to mechanical vibrations over a large frequency range.

The invention is preferably practiced as follows: A nanochannel glass material is fabricated using rod material and matrix material that have closely matched indices of refraction. The techniques for fabricating nanochannel glass (NCG) provide an economical and efficient method of obtaining large uniform arrays of dielectrics, having repeat distances ranging from hundreds of microns to a few nanometers. The NCG can be built in such a way as to provide arrays of various geometries, consisting of two or more dielectrics in a repeating pattern. The final etching step that is commonly carried out on nanochannel glass used for other purposes, where one or more of the constituent dielectrics are removed via selective etching, may be omitted. The unetched NCG material consists of a two-dimensional array of dielectrics and hence is intrinsically a photonic band-gap material, useful for optical filtering. The simplest examples of the arrays obtained in this process consist of non-overlapping identical "rods" of one dielectric within a matrix of another dielectric, forming a triangular, square, or graphite lattice as shown in FIG. 1. More complicated patterns consisting of two or more dielectrics can also be obtained. In each pattern, both the lattice spacing and the size of the cross-sectional area of each dielectric region can be controlled independently. A slice of NCG can be cut, ground to a desired thickness, and polished. The result is a cylinder consisting of a uniform array of dielectrics; the plane of the array is perpendicular to the cylinder axis. For light propagating in the plane of the array, this is an effective photonic band-gap material whose optical properties are determined by the difference between the indices of refraction of the dielectrics ($\Delta n$) and their geometrical arrangement.

Depending on the spectral region of interest, different materials can be used to form such structures with various $\Delta n$'s. For example, in the UV, visible and near-IR regions, structures with relatively small $\Delta n$'s (between 0 and 0.5) can be obtained by using various silica-based glasses. Higher $\Delta n$'s can be obtained by incorporating low-index silica-based glasses together with high-index materials, such as oxides or fluorides of rare-earths or transition-metals, phosphates, borates or large-bandgap semiconductors. Farther in the IR, small $\Delta n$'s can be obtained with various organic polymers (which may not have optical properties suitable for use at shorter wavelengths), while high $\Delta n$'s can be obtained from a wide range of semiconductors or high-index dielectrics (such as quartz, sapphire, various chalcogenides, et al.). The transparency region for chalcogenides glasses is between 1 and 14 microns.

Since these NCG-based structures do not exhibit the same transmission properties for all incidence directions within the plane of the array, the light can be constrained to propagate within a range of angles by cutting a slice of the cylinder perpendicular to the desired propagation direction and parallel to the cylinder axis. After polishing the resulting faces, one obtains a flat "window" suitable for use as an optical filter. The transmission properties along a given direction become constant for thicknesses greater than about 10 repeat distances of the array, but can vary for smaller thicknesses.

The positions, widths and depths of the notches in the transmission of such a dielectric structure are controlled by several factors. These include: the indices of refraction of the "rods" and the "matrix," the use of several types of "rods" having several different indices of refraction, the use of "rods" having non-circular cross-sectional shape, the cross-sectional size of the "rods," the geometry of the two-dimensional array, the use of complex groupings as the repeating unit in the array, etc. For any wavelength of interest in the range from the UV to the far-IR, a structure can be found that exhibits a notch in its optical transmission at that wavelength and which is insensitive to the angle of incidence, if desired. In fact, since most structures exhibit notches in several different wavelength regions, it is possible to find a number of alternate structures having a notch at a particular wavelength, and also to design single structures that serve as notch filters in several different wavelength regions simultaneously.

Additional control of the filtering properties of these structures can be achieved by incorporating materials with well-characterized absorptions in the relevant spectral region. For example, the incorporation of defects or impurities into a material can create absorption lines or bands with sharp or broad linewidths. Near these absorptions, the index of refraction of the material is modified. In turn, this leads to a modified $\Delta n$ within a structure which includes the material. This impurity-induced $\Delta n$ can thus be used to control the spectral characteristics of a filter based on such a structure.

Another method of employing these structures as optical filters involves using the cylindrical NCG slice directly, without turning it into a flat "window," as described above. For collimated light propagating in the plane of the dielectric array along a direction corresponding to an angle-sensitive notch in the transmission, it is then possible to adjust the width of the notch filter by simply adjusting the diameter of the incident beam. To minimize reflectivity losses, the beam diameter should be much smaller than the radius of curvature of such a "cylindrical" filter.

Since the transmission properties of two-dimensional photonic band-gap materials are also polarization-sensitive for certain structures (see FIG. 2), it is also possible to use such dielectric structures for controlling the polarization of incident light within the spectral regions corresponding to the notches in the transmission.

With proper choice of dielectric structure, propagation direction and particular order of the photonic gap, the properties of optical filters based on two-dimensional photonic band-gap materials can be made nearly independent of incidence angle over a large range of angles. This makes them useful for a wide range of instruments, such as those required to gather light from a large solid angle. By contrast, the properties of the multilayer dielectric film filters currently in use are always highly angle-dependent, which makes them inadequate in all situations where the incident light is uncollimated. Whenever angle tuning of the transmission notch is desirable, the new filters can satisfy this requirement as well when they are designed around angle-sensitive notches.

One of the limitations of the multilayer dielectric film filters currently in use is that they consist of thin films which are required to be extremely uniform in both composition and thickness; such uniform films are generally difficult and expensive to obtain over areas greater than approximately 2×2 inches. Since the fabrication process for NCG materials allows the side-by-side bundling of long continuous array elements, large filters based on two-dimensional photonic band-gap materials can be manufactured. With existing technology, it is currently possible to build filters with cross-sections up to several square feet. However, it should be possible to fabricate filter structures over an order of magnitude larger by bundling more fibers of greater length next to one another.

In addition, the new optical filters described above are as rugged as the NCG starting material: they are much less sensitive to environmental factors (heat, humidity, mechanical contact) than the current multilayer dielectric film filters, and they can be cleaned and handled like any other uncoated glass component. There are no critical requirements on the finish of these filters; the faces through which the light propagates only need to be polished well enough to minimize scattering losses in the wavelength range of interest. With appropriate choices of materials and geometry, the notches in the transmission of these filters can be located anywhere in the spectral region between the UV and far-IR. Since these new filters consist of bulk dielectric structures, they should be much more resistant to damage by intense light sources, such as certain lasers, than the multilayer dielectric film filters currently in use.

EXAMPLE 1

Figure 3:
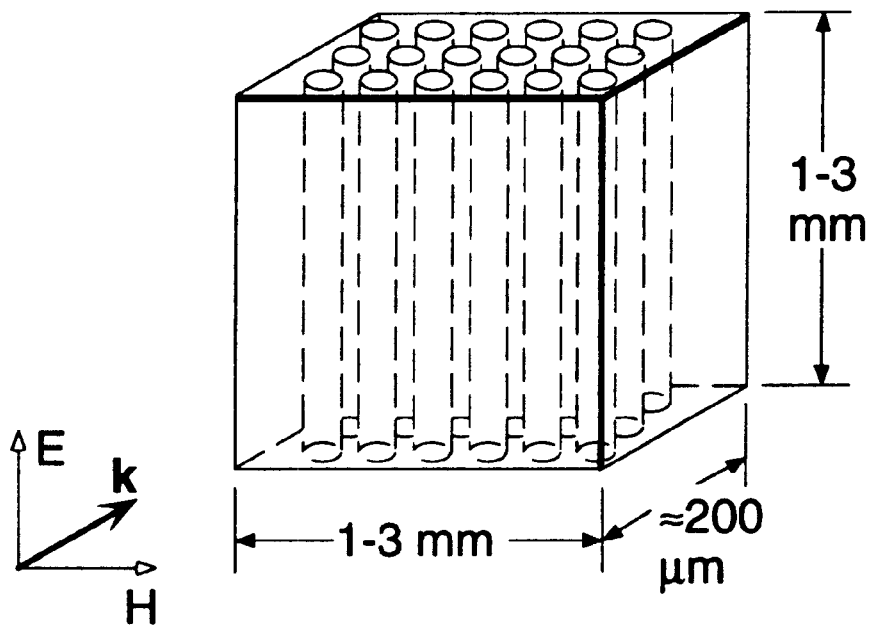
FIG. 3 is a diagrammatic view of a lattice showing the direction of propagation of light through the sample.
Figure 4:
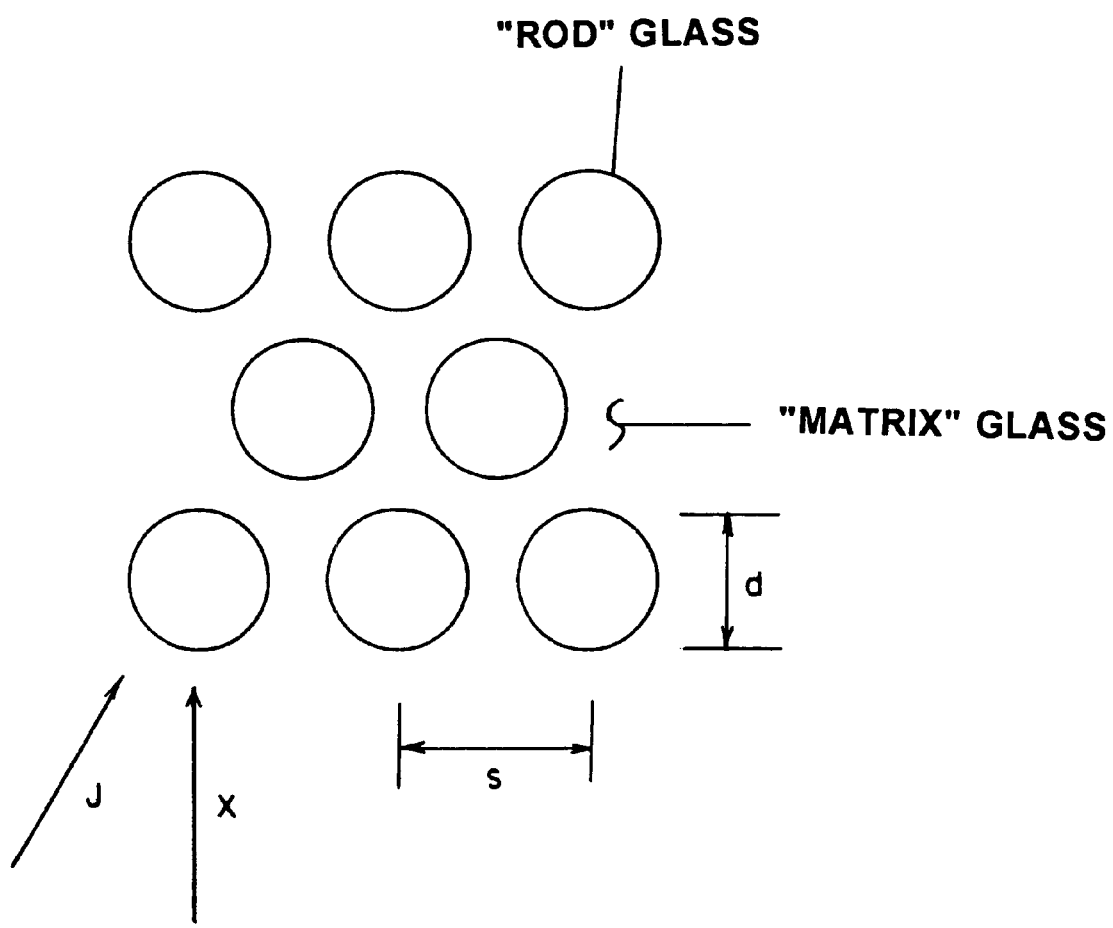
FIG. 4 is a diagram showing the two principle axes X and J contained within a triangular lattice.

The sample was prepared by taking a piece of oriented channel glass and polishing it to a height of 3 millimeters. The nanochannel glass sample was then sectioned along a principle axis of the 2-dimensional array with a width of 3 millimeters and a thickness of 200 microns as shown in FIG. 2 and FIG. 3. The structure of the simple triangular (hexagonal) array of glass "rods" in a glass "matrix." is shown in FIG. 4. The two arrows in FIG. 4, labeled "X" and "J," indicate the two high-symmetry directions for light propagating through this structure. The repeat distance (center-to-center spacing of the "rods") in the array is s, and the "rod" diameter is d. For this example, the rods have a circular cross-section with diameters of 0.38 $\mu$m and a repeat distance of 0.57 $\mu$m. The difference in refractive index between the rods and matrix glasses were less than $\Delta n = 10^{-2}$ over the entire spectral range data was taken.

Figure 5:
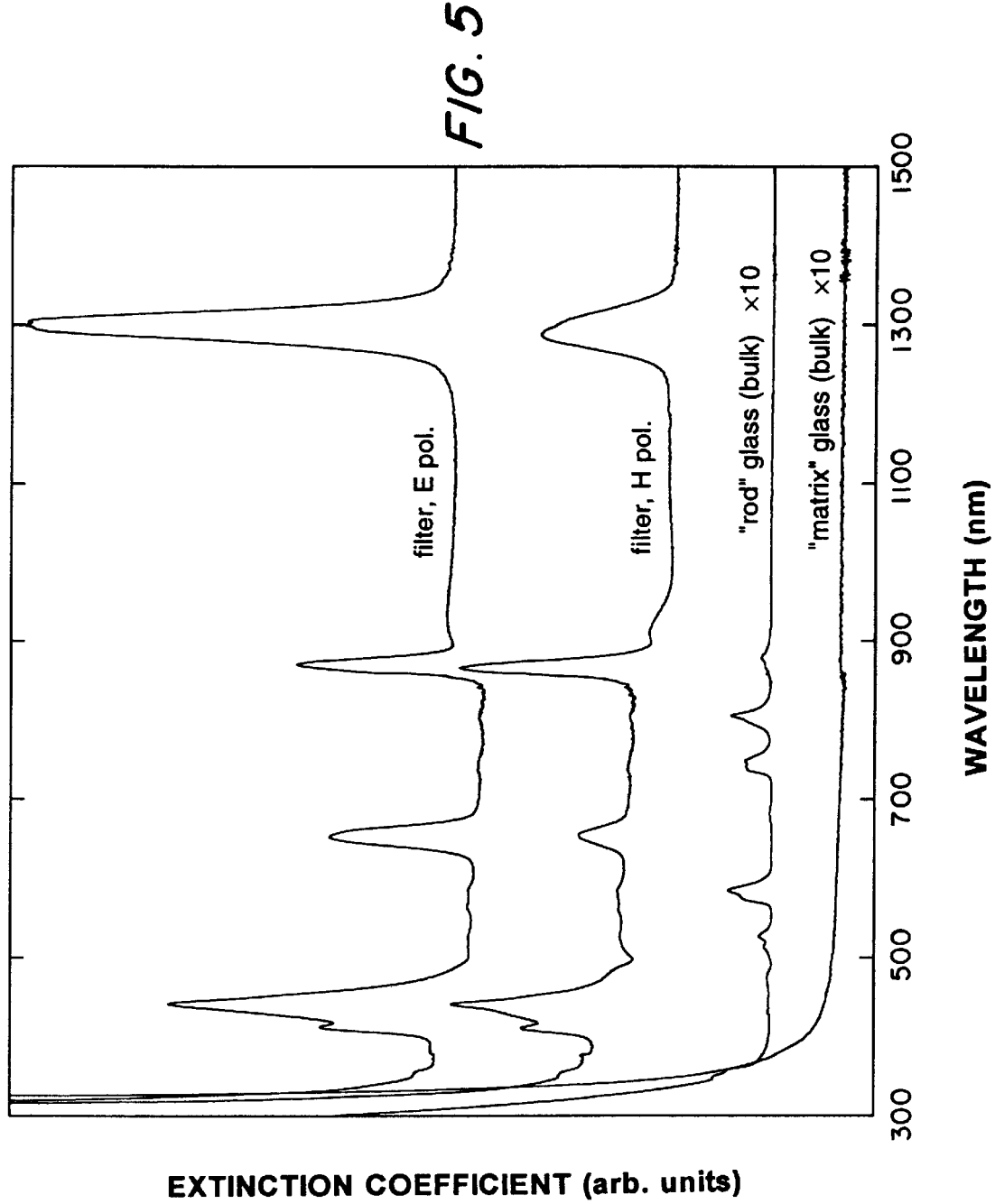
FIG. 5 is a superimposed spectra of matrix glass, the rod or channel glass and the filter in H and E polarizations.

Transmission spectra for the filter is shown in FIG. 5 with the incidence direction labeled as "J" in FIG. 4. Two polarizations are shown, labeled "E" and "H." For E the electric field of the incident light is parallel to the axes of the "rods," and for H the electric field is perpendicular to the axes of the rods. The transmission curves of the individual (bulk) glasses are also included, on an expanded vertical scale relative to the filter transmission curves: both bulk glasses are highly transparent throughout the spectral region shown, although some weak absorptions are observed for the "rod" glass. The latter absorptions are weak enough that they do not contribute to the filter transmission. The slight discontinuity near 900 nm is an artifact of the spectrometer used for these measurements. The notches for both polarizations in the transmission centered near 1300 nm and have full width at half maximum of less than 40 nm for the fundamental (first) gap in the J direction. The second order gaps near 880 nm have full width at half maximum of less than 10 nm. As seen in FIG. 5, additional notches in the transmission spectra occur for higher-order gaps.

EXAMPLE 2

Figures 6A, 6B:
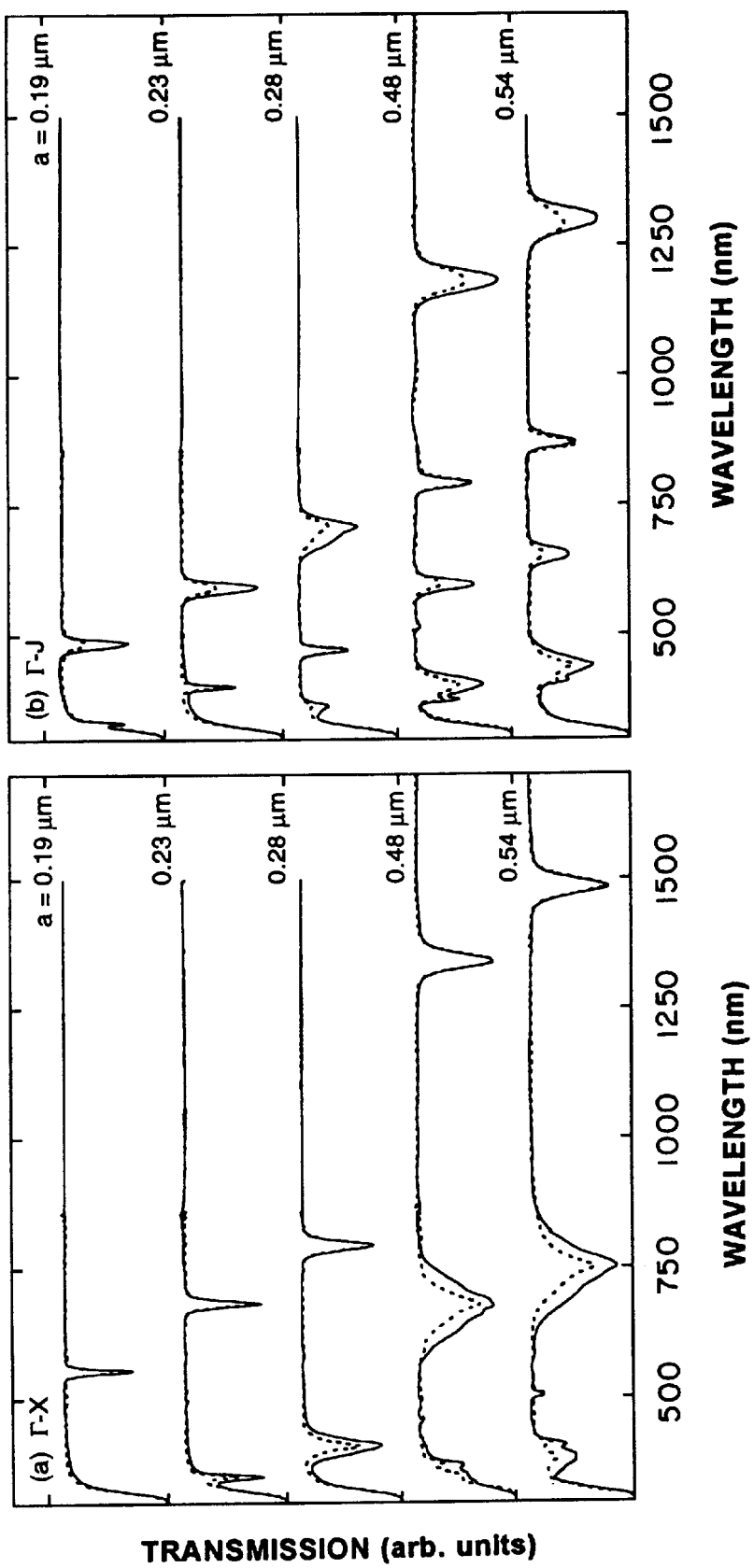
FIGS. 6A and B are superimposed filter transmission spectra as a function of center to center spacing of the channels for the X and J directions.
Figure 7:
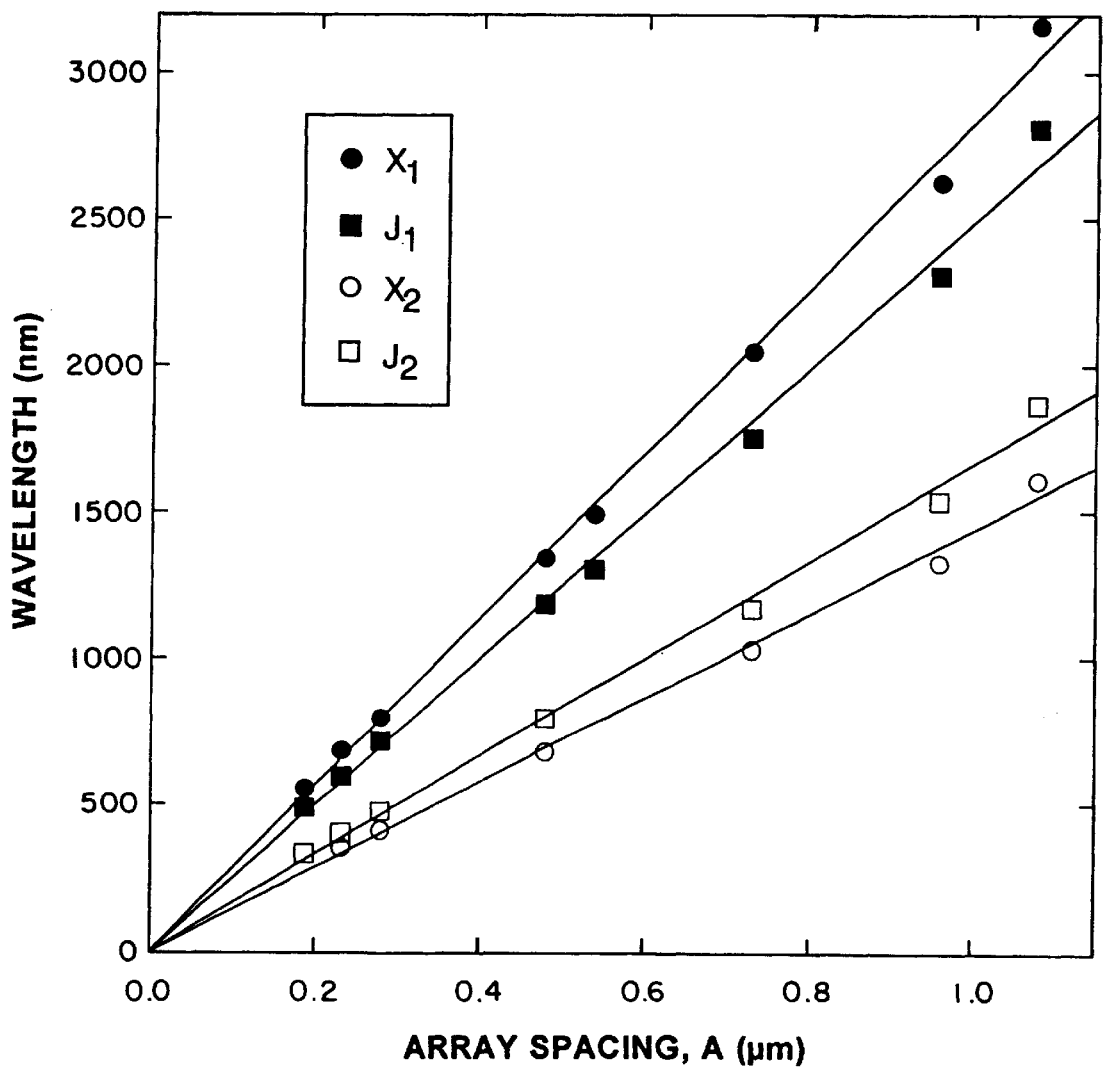
FIG. 7 is a plot of the peak position of the first and second order bands as a function of array spacing for the X and J directions.

For small differences in index of refraction ($\Delta n < 10^{-2}$), the notches in the transmission are very sharp. Using the same triangular (hexagonal) lattice of "rods" as in example 1, we have obtained notches in the transmission from the near ultraviolet through the near infrared with channel center-to-center spacings ranging from 0.19 microns to 0.54 microns as shown in FIG. 6. The full width at half maximum of some notches being less than 10 nm. Both the X direction and the J direction are shown in the figure. The position of the first and second order photonic gaps as a function of channel center-to-center spacings are plotted in FIG. 7 along with theoretical predictions (solid lines) for the triangle lattice. The linear relationship between channel center-to-center spacings and position of gaps are a clear indication of the predictability of the structures given the index of refraction of the materials, the center-to-center spacings of the channels and the geometry of the array.

Figure 8:
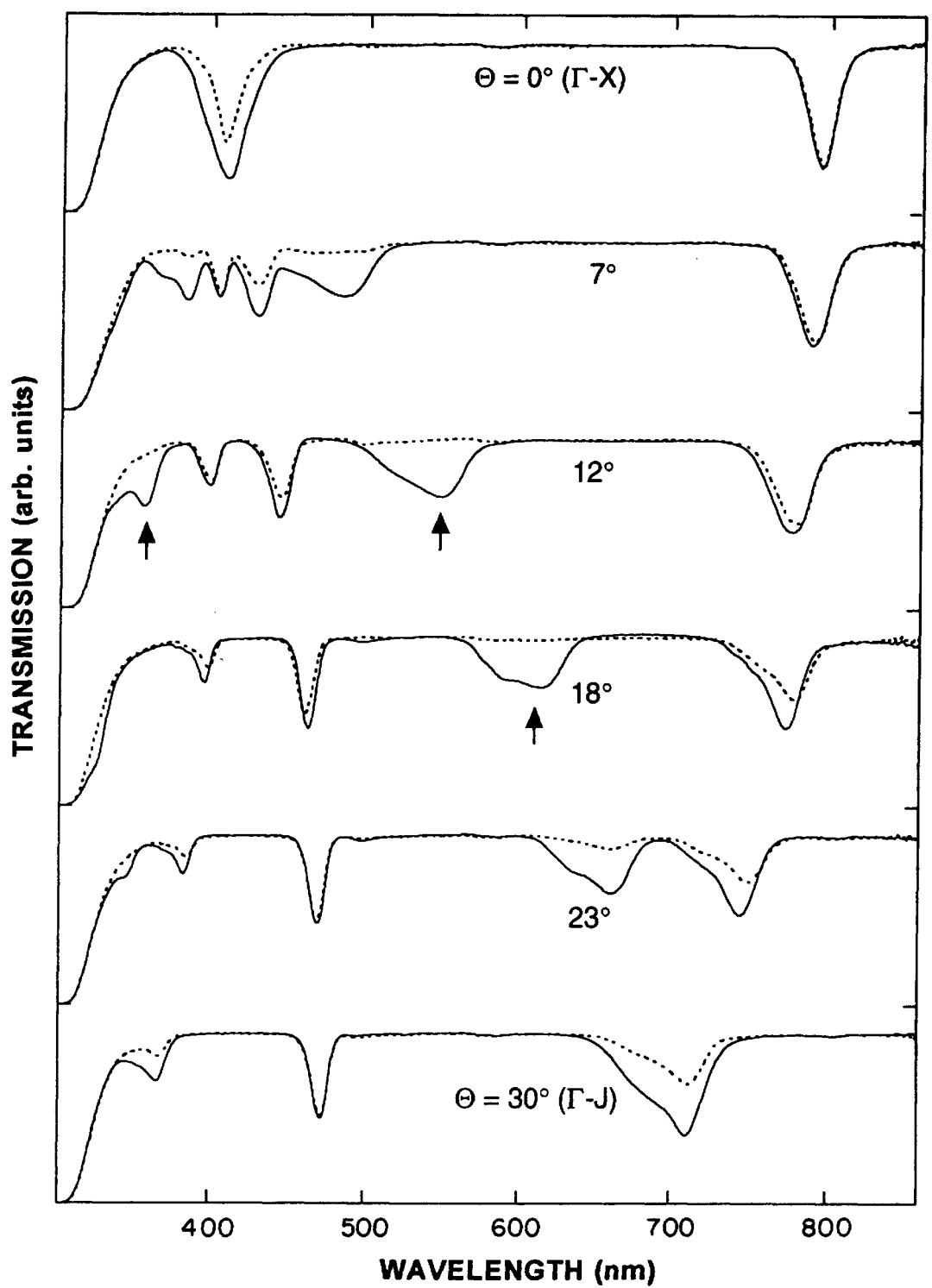
FIG. 8 is superimposed filter transmission spectra as a function of angles between the X and J directions

FIG. 8 shows the angular dependence of the transmission spectra for the same filter configuration as above with the center-to-center spacing equal to 0.28 microns. The transmission data is taken as the sample is rotated from one principle axis to the other through an angle of 30 degrees. The second order gap along J is seen to be very insensitive to changes in angle as the sample is rotated towards X while the primary J bandgap is shown to be highly sensitive to angular rotations (in the plane). Changes in the angle of incidence up to ±15° for some notches make them suitable for optical filters in systems where the required f/# (the focal distance divided by the diameter of the effective aperture) is 1.4 or greater. Other notches in the same filter are useful for filtering shorter wavelengths. The notches that show significant angular sensitivity can be useful since the filter properties can then be adjusted by simply changing the angle of incidence for a collimated source. Effectively, one can also control the width of such angle-sensitive notches by focusing a source to an appropriate f/# or by changing the curvature of the filter surfaces to form a lens (rather than the flat "window" geometry, described above). Alternately, the widths of all notches can be controlled by adjusting the difference in the indices of refraction in the structure ($\Delta n$) while keeping a constant geometry, which does not affect the angular sensitivity of the filter.

Tilting the filter about an axis perpendicular to the channels causes a shift in the position of the photonic structures towards shorter wavelengths.

Obviously, many modifications and variations of the present invention are possible in light of the above teachings. It is therefore to be understood that, within the scope of the appended claims, the invention may be practiced otherwise than as specifically described.

What is claimed is:

1. A band-gap spectral filter comprising
a nanochannel glass structure having a two-dimensional array of parallel dielectric rods having a first refractive index, arranged in a matrix material having a second refractive index, wherein the difference between the first refractive index and the second refractive index is equal to or less than about 0.7.

2. The band-gap spectral filter of claim 1 wherein the difference between the first refractive index and the second refractive index is equal to or less than about 0.1.

3. The band-gap spectral filter of claim 1 wherein the difference between the first refractive index and the second refractive index is equal to or less than about 0.05.

4. The band-gap spectral filter of claim 1 wherein the difference between the first refractive index and the second refractive index is equal to or less than about 0.02.

5. The band-gap spectral filter of claim 1 wherein the difference between the first refractive index and the second refractive index is equal to or less than about 0.01.

6. The band-gap spectral filter of claim 1 wherein the rods have a circular cross-section.

7. The band-gap spectral filter of claim 6 wherein the rods are arranged in a graphite array.

8. The band-gap spectral filter of claim 6 wherein the rods have an equal radius.

9. The band-gap spectral filter of claim 8 herein the distance between adjacent rods is less than five times the radius of the rods.

10. The band-gap spectral filter of claim 8 wherein the distance between adjacent rods is less than three times the radius of the rods.

11. The band-gap spectral filter of claim 8 wherein the distance between adjacent rods is more than five times the radius of the rods.

12. The band-gap spectral filter of claim 1 wherein the rods are arranged in a hexagonal close-packed array.

13. The band-gap spectral filter of claim 1 wherein the rods are arranged in a triangular array.

14. The band-gap spectral filter of claim 1 wherein the rods are arranged in a rectangular array.

15. The band-gap spectral filter of claim 1 wherein the rods are arranged in a square array.

16. The band-gap spectral filter of claim 1 wherein the nanochannel glass structure includes a surface oriented to receive electromagnetic energy propagating in a direction approximately transverse to the axes of the parallel rods.

17. The band-gap spectral filter of claim 1 wherein the matrix material is selected from the group of glasses consisting of silicates, alumino-silicates and aluminates.

18. The band-gap spectral filter of claim 1 wherein the matrix material is selected from the group of glasses consisting of germanates, phosphates and borates.

19. The band-gap spectral filter of claim 1 wherein the matrix material is selected from the group of glasses consisting of oxides and fluorides of rare-earth metals and transition metals.

20. The band-gap spectral filter of claim 1 wherein the rods are selected from the group of glasses consisting of silicates, alumino-silicates and aluminates.

21. The band-gap spectral filter of claim 1 wherein the rods are selected from the group of glasses consisting of germanates, phosphates and borates.

22. The band-gap spectral filter of claim 1 wherein the rods are selected from the group of glasses consisting of oxides and fluorides of rare-earth metals and transition metals.

23. The band-gap spectral filter of claim 1 wherein the filter has a band-gap in the infrared.

24. The band-gap spectral filter of claim 1 wherein the filter has a band-gap in the near infrared.

25. The band-gap spectral filter of claim 1 wherein the filter has a band-gap in the visible.

26. The band-gap spectral filter of claim 1 wherein the filter has a band-gap in the near ultraviolet.

27. The band-gap spectral filter of claim 1 wherein the filter is angle tunable about an axis parallel to the axis of the rods.

28. The band-gap spectral filter of claim 1 wherein the filter is tilt tunable about an axis perpendicular to the axis of the rods.

29. The band-gap spectral filter of claim 1 wherein each rod has an index of refraction that varies radially within the rod.

30. A method of using the band-gap spectral filter of claim 1 comprising propagating electromagnetic energy in a direction approximately transverse to the axes of the parallel dielectric rods.

31. A band-gap spectral filter comprising
a nanochannel glass structure having a two-dimensional lattice array comprising an ordered mixture of at least two types of parallel dielectric rods having different refractive indices, arranged in a matrix material.

32. A method of forming an optical filter comprising the steps of
providing a nanochannel glass structure having a two-dimensional array of parallel dielectric rods having a first refractive index, arranged in a matrix material having a second refractive index, wherein the difference between the first refractive index and the second refractive index is less than 0.5 and
cutting the nanochannel glass structure to form a surface thereon, the surface being oriented to receive electromagnetic energy propagating in a direction approximately transverse to the axes of the parallel rods.

33. A method of forming an optical filter comprising the steps of
providing a nanochannel glass structure having a two-dimensional array of parallel dielectric rods of etchable glass, arranged in a matrix material of nonetchable glass,
removing the etchable glass to create hollow channels through the nonetchable glass,
filling the hollow channels with a nonglass material, and
cutting the nanochannel glass structure to form a surface thereon, the surface being oriented to receive electromagnetic energy propagating in a direction approximately transverse to the axes of the parallel rods.

34. The method of claim 33, wherein the nonglass material is selected from the group consisting of metals, polymers and semiconductors.

35. The method of claim 33, wherein the nonglass material is a polymer containing refractive index modifying material.

36. The method of claim 35, wherein the refractive index modifying material is selected from the group consisting of semiconductor nano-crystals, laser dyes and luminescent materials.

37. The method of claim 33, wherein the filled channels of nonglass material have refractive indices that vary in a radial direction.

38. The method of claim 33, wherein the filled channels of nonglass material have refractive indices that vary in a radial direction in a stepwise fashion.

* * * * *